Patented Feb. 21, 1950

2,498,574

UNITED STATES PATENT OFFICE 2,498,574

DIHYDROSTREPTOMYCIN AND ACID ADDITION SALTS

Robert L. Peck, Plainfield, N. J., assignor to Merck & Co., Inc., Rahway, N. J., a corporation of New Jersey No Drawing. Application February 15, 1946, Serial No. 648,007

13 Claims. (Cl. 260—205)

This invention relates to processes for preparing new therapeutically useful anti-biotic substances, and particularly to the new anti-biotic substance, dihydrostreptomycin, and acid salts thereof and the process for preparing the same by catalytic reduction of acid salts of streptomycin.

Streptomycin, which is a water-soluble, levorotatory, thermostable, nitrogenous, basic organic substance exhibiting therapeutically useful properties, is elaborated by strains of the micro-organism, *Actinomyces griseus*, in suitable culture media (Proc. Soc. Expl. Biol. Med., 55, 66–69 (1944)). Streptomycin is strongly bacteriostatic against gram-positive organisms, including *Bacillus mycoides* and *Bacillus cereue*, and against gram-negative organisms, including *Pseudomonas fluorescens*, *Pseudomonas aeroginosa* and *Serratia marcescens*.

Streptomycin is obtained from the elaboration product of the *A. griseus* by adsorption on activated carbon followed by elution with an acidic solvent in a manner similar to that used for streptothricin (Proc. Soc. Expl. Biol. Med., 49, 207–212 (1942)). The crude product thus obtained is a streptomycin acid salt such as streptomycin hydrochloride of low activity or potency. The activity or potency of this anti-biotic is a measure of the purity of the material and is determined by biological methods in terms of the inhibition of growth of micro-organisms such as *E. coli* and *B. subtilis* in comparison with a standard of known activity. The present procedure for assaying streptomycin is the same as that used for streptothrycin (J. Bact., 45, 408–409 (April 1943)).

The crude streptomycin acid salt can be purified by repeated selective adsorption and elution using an adsorbent medium such as acid-washed aluminum oxide in accordance with a process fully disclosed in my pending application Serial No. 601,337, filed June 23, 1945. By this procedure alone, or by using this procedure followed by preparation of the crystalline helianthine salt of streptomycin and subsequent conversion thereof to desired mineral acid salts in accordance with the procedure fully described in the pending application of my colleague Karl Folkers, Serial No. 601,335, filed June 23, 1945, now Patent No. 2,462,175, substantially pure acid salts of streptomycin are obtained. These acid salts contain three equivalents of acid per mole of streptomycin base.

While the streptomycin acid salts thus obtained are in a form suitable for therapeutic use, it is found that these compounds have certain inherent disadvantages including a degree of chemical instability evidenced particularly in media containing components capable of reacting with carbonyl groups.

It is now discovered, according to the present invention, that when an acid salt of streptomycin is subjected to the action of hydrogen in the presence of a noble metal catalyst, hydrogen is adsorbed in the ratio of one mole per mole of streptomycin salt thereby forming the corresponding dihydrostreptomycin compound in substantially quantitative yield. The dihydrostreptomycin compounds are approximately as active anti-biotically as the streptomycin salts and are equally suitable for clinical application. The essential advantage of the dihydrostreptomycin compounds over previously known streptomycin salts resides in the greater stability of the dihydrostreptomycin compounds in the presence of substances capable of reacting with carbonyl groups.

The salts of the two anti-biotic substances are scarcely distinguishable analytically, but they are readily distinguished by the fact that dihydrostreptomycin salts are stable for 24 hours in a slight excess of hydroxylamine in buffered aqueous solution at pH 4 while corresponding streptomycin acid salts are completely inactivated by this reagent.

Regarded in certain of the broader aspects, novel features of the present invention comprise the new and therapeutically useful anti-biotic substance of the class consisting of dihydrostreptomycin and acid salts thereof and the process for preparing the same by catalytic reduction of acid salts of streptomycin. The acid salts contemplated in the present invention are acid salts in which the acid moiety either resists reduction or, if reduced, does not react with or prevent reduction of streptomycin during the reduction process. Suitable acid salts are mineral acid salts and organic acid salts in which the acid moiety contains no reducible groups other than C=C bonds.

In carrying out the process in accordance with the present invention a quantity of an acid salt of streptomycin is dissolved in water in which is suspended a noble metal catalyst such as platinum metal, platinum oxide, palladium metal, and the like and a mixture is placed under a hydrogen atmosphere and shaken or agitated for a time sufficient to consume approximately one mole of hydrogen per mole of streptomycin salt employed at atmospheric pressure. In general, the reaction is faster with platinum than with palladium, using a given amount of catalyst. The amount of catalyst used is not critical in the reaction although the rate of the reduction is increased or decreased with an increase or decrease in the amount of catalyst. It will also be understood that the time for completing the reaction can be shortened by conducting the reaction at increased pressure.

As starting materials, it is possible to use impure concentrates of streptomycin salts, but it is preferred to use a substantially pure acid salt such as streptomycin trihydrochloride for the process.

After completion of the reduction, the catalyst is removed by filtration and the dihydrostreptomycin compound is isolated, preferably by freezing the filtrate and drying under vacuum from the frozen state. The free base, dihydrostreptomycin, can be prepared from an acid salt by subjecting a solution of the acid salt to a reaction with a base or basic oxide which forms substantially quantitatively an insoluble salt with the acid ion of the streptomycin salt. Thus, for example, reacting an aqueous solution of dihydrostreptomycin sulfate with the stoichiometric equivalent of barium hydroxide precipitates the sulfate as insoluble barium sulfate which is readily removed by filtration and the free base can then be recovered from the filtrate by precipitation from suitable aqueous-organic solvent mixture or by freeze-drying.

The empirical formulae for streptomycin and dihydrostreptomycin are believed to be $$C_{21}H_{39}N_7O_{12}$$

and $C_{21}H_{41}N_7O_{12}$ respectively, and in the accompanying examples empirical formulae for dihydrostreptomycin and its salts have been designated accordingly. It is to be noted, however, that the number of hydrogen atoms in the streptomycin molecule is doubtful, and might better be expressed as $H_{37-39}$. In any event, dihydrostreptomycin has two more hydrogen atoms than streptomycin.

The following examples illustrate methods of carrying out the present invention, but it is to be understood that these examples are given by way of illustration and not of limitation.

*Example I*

About 50 mgm. of plantinum oxide ($PtO_2 \cdot 2H_2O$) suspended in 10 cc. of water is reduced with hydrogen and 48.0 mgm. of streptomycin hydrochloride is added. A hydrogen atmosphere is maintained and the mixture is agitated for about one and one-half hours, during which time approximately one molar equivalent of hydrogen is absorbed by the streptomycin hydrochloride in addition to that absorbed by the catalyst. The catalyst is then removed by filtration and the filtrate is frozen and dried under vacuum from the frozen state. Dihydrostreptomycin hydrochloride is thus recovered as a white powder which is further dried at about 56° C. in vacuo over $P_2O_5$ for two hours. This product has an activity of about 762 units per mgm. and exhibits an optical rotation $\alpha_D^{25} = -88.7°$ (c, 1% water).

The corresponding helianthine salt is prepared by adding a warm aqueous solution of methyl orange to dihydrostreptomycin hydrochloride dissolved in methanol. Orange crystals with metallic luster separate and the product obtained after two recrystallizations from aqueous methanol has an activity of about 350 units/mgm. and the following partial analysis: Calculated for $C_{21}H_{41}N_7O_{12}(C_{14}H_{15}N_3O_3S)_3$: C, 50.46; H, 5.79; N, 14.94. Found: C, 50.22; H, 5.76; N, 15.17.

*Example II*

About 255 mgm. of platinum oxide, suspended in 125 cc. of water containing one drop of 2 N hydrochloric acid, is reduced with hydrogen, and 1.396 gm. of streptomycin hydrochloride is added. The mixture is agitated in a hydrogen atmosphere for about one hour, during which time approximately one molar equivalent of hydrogen is consumed per mole of streptomycin trihydrochloride in addition to that absorbed by the catalyst. The catalyst is then removed by filtration and the solution is frozen and dried from the frozen state, giving a quantitative yield of dihydrostreptomycin hydrochloride as a white granular solid having an activity of about 750 units/mgm. and exhibiting an optical rotation $\alpha_D^{25} = -84°$ (c, 1% in water). A partial analysis of this product is as follows: Calculated for $C_{21}H_{41}N_7O_{12} \cdot 3HCl$: N, 14.15; Cl. 15.35. Found: N, 13.91; Cl, 15.36.

A portion of the dihydrostreptomycin hydrochloride is converted to the crystalline helianthine salt by the procedure given in Example I, and the product thus obtained has the following partial analysis: Calculated for $$C_{21}H_{41}N_7O_{12} \cdot (C_{14}H_{15}N_3O_3S)_3$$

C, 50.59; H, 5.53. Found: C, 50.89; H, 5.75.

*Example III*

Equals amounts of treptomycin hydrochloride and dihydrostreptomycin hydrochloride are treated with slightly more than a molar equivalent of hydroxylamine buffered to pH 4 and allowed to stand for 24 hours at 25° C. At the end of this period, the anti-biotic activity of the streptomycin salt is completely destroyed, while the activity of the dihydrostreptomycin salt remains approximately 750 units/mgm.

*Example IV*

About 1.5 gm. of streptomycin sulfate is dissolved in about 125 cc. of water and 0.3 gm. of platinum catalyst ($PtO_2 \cdot 2H_2O$) is added. The mixture is shaken mechanically while a hydrogen atmosphere is maintained in the reaction vessel. After one hour, approximately one mole of hydrogen has been absorbed per mole of streptomycin sulfate in addition to the hydrogen absorbed by the catalyst. The catalyst is then removed by filtration and the filtrate is frozen and dried from the frozen state giving a substantially quantitative yield of dihydrostreptomycin sulfate as a voluminous white powder. This product has an activity of about 700 units/mgm. and an optical rotation $\alpha_D^{25} = -78°$ (c, 1.5% in water). The empirical formula for this product is $$(C_{21}H_{41}N_7O_{12})_2 \cdot 3H_2SO_4$$

*Example V*

About 2.9 gm. of streptomycin hydrochloride is dissolved in 100 cc. of water and 0.3 gm. of palladium metal catalyst, prepared according to Willstätter and Waldschmidt-Leitz, Ber., 54, 123 (1921), is added. The mixture is placed under a hydrogen atmosphere and shaken mechanically. Hydrogen uptake is slow and after about two hours' shaking, 0.5 gm. of palladium catalyst is added to increase the rate of reduction. Approximately one mole of hydrogen per mole of streptomycin hydrochloride is absorbed at the end of about 24 hours' shaking. The catalyst is filtered off and the filtrate is frozen and dried under vacuum from the frozen state, yielding dihydrostreptomycin hyrochloride as a white granular solid having an activity of about 700 units/mgm. and an optical rotation $\alpha_D^{25} = -82°$ (c, 1.0% in water).

Example VI

To about 428 mgm. of dihydrostreptomycin sulfate in about 5 cc. of water is slowly added 3.8 cc. of 0.465 N barium hydroxide solution. The barium sulfate formed is removed by filtration. Tests for barium and sulfate ions in the clear, colorless filtrate are negative. The filtrate is then mixed with one volume of acetone causing slow separation of a micro-crystalline precipitate weighing about 110 mgm. The supernatant solution is mixed with about 10 volumes of acetone causing the separation of a second crop of white micro-crystalline material weighing about 150 mgm. Both crops of the free base, dihydrostreptomycin, show an activity of about 750 units/mgm. and an optical rotation $\alpha_D^{25} = -92°$ (c, 1% in pH 7.0 buffer solution). When heated on the micro-block, crystals of the free base begin to develop a slight yellow color at about 130° C. and melt to a soft mass at 195–205° C. with the formation of an orange-brown color and with the evolution of a small amount of gas. The empirical formula for the free base is $C_{21}H_{41}N_7O_{12}$.

Modifications may be made in carrying out the present invention without departing from the spirit and scope thereof, and my invention is to be limited only by the appended claims.

I claim:

1. The process that comprises reacting an acid salt of streptomycin with hydrogen in the presence of a hydrogenation catalyst and recovering the corresponding salt of dihydrostreptomycin from the reaction mixture.

2. The process that comprises reacting an aqueous solution of an acid addition salt of streptomycin with hydrogen in the presence of a hydrogenation catalyst until substantially one mole of hydrogen per mole of streptomycin is taken up and recovering from the reaction mixture the corresponding acid salt of dihydrostreptomycin.

3. The process that comprises reacting an acid salt of streptomycin with hydrogen in the presence of platinum oxide catalyst and recovering from the reaction mixture the corresponding acid salt of dihydrostreptomycin.

4. The process that comprises reacting streptomycin hydrochloride with hydrogen in the presence of a hydrogenation catalyst and recovering from the reaction mixture dihydrostreptomycin hydrochloride.

5. The process that comprises reacting streptomycin sulfate with hydrogen in the presence of a hydrogenation catalyst and recovering from the reaction mixture of dihydrostreptomycin sulfate.

6. The process that comprises reacting a substantially pure acid salt of streptomycin with hydrogen in the presence of a hydrogenation catalyst, removing the salt component of the dihydrostreptomycin acid salt thus formed by adding the stoichiometric equivalent of a base which forms an insoluble compound with said salt component, filtering off the insoluble compound, and recovering from the filtrate the free base, dihydrostreptomycin.

7. The process that comprises reacting substantially pure streptomycin sulfate with hydrogen in the presence of a hydrogenation catalyst, removing the sulfate component of the dihydrostreptomycin sulfate thus formed by adding the stoichiometric equivalent of barium hydrate and precipitating barium sulfate, filtering off the precipitate, and recovering from the filtrate the free base, dihydrostreptomycin.

8. A substance of the class consisting of dihydrostreptomycin and acid salts thereof.

9. Dihydrostreptomycin.

10. Acid addition salts of dihydrostreptomycin.

11. Dihydrostreptomycin hydrochloride.

12. Dihydrostreptomycin sulfate.

13. Dihydrostreptomycin helianthate.

ROBERT L. PECK.

No references cited.